(12) United States Patent
Purcell

(10) Patent No.: US 7,953,726 B2
(45) Date of Patent: May 31, 2011

(54) GENERATED PREDICATES FROM MATERIALIZED RESULT

(75) Inventor: Terence Patrick Purcell, New Berlin, IL (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 12/185,103

(22) Filed: Aug. 3, 2008

(65) Prior Publication Data

US 2008/0288469 A1    Nov. 20, 2008

Related U.S. Application Data

(63) Continuation of application No. 11/014,155, filed on Dec. 15, 2004, now Pat. No. 7,536,379.

(51) Int. Cl.
    *G06F 17/30*    (2006.01)
(52) U.S. Cl. .................................................. 707/714
(58) Field of Classification Search .................. None
    See application file for complete search history.

(56) References Cited

U.S. PATENT DOCUMENTS

| | | | |
|---|---|---|---|
| 5,542,073 A | 7/1996 | Schiefer et al. | |
| 5,903,893 A | 5/1999 | Kleewein et al. | |
| 5,930,785 A | 7/1999 | Lohman et al. | |
| 5,937,195 A | 8/1999 | Ju et al. | |
| 5,960,428 A | 9/1999 | Lindsay et al. | |
| 5,987,453 A | 11/1999 | Krishna et al. | |
| 6,026,390 A | 2/2000 | Ross et al. | |
| 6,125,360 A * | 9/2000 | Witkowski et al. | 1/1 |
| 6,138,111 A | 10/2000 | Krishna | |
| 6,199,063 B1 | 3/2001 | Colby et al. | |
| 6,334,128 B1 | 12/2001 | Norcott et al. | |
| 6,339,769 B1 | 1/2002 | Cochrane et al. | |
| 6,341,281 B1 * | 1/2002 | MacNicol et al. | 1/1 |
| 6,345,272 B1 | 2/2002 | Witkowski et al. | |
| 6,356,889 B1 | 3/2002 | Lohman et al. | |
| 6,356,890 B1 * | 3/2002 | Agrawal et al. | 1/1 |
| 6,377,943 B1 | 4/2002 | Jakobsson | |
| 6,385,603 B1 * | 5/2002 | Chen et al. | 1/1 |
| 6,397,204 B1 | 5/2002 | Liu et al. | |
| 6,439,783 B1 | 8/2002 | Antoshenkov | |
| 6,496,819 B1 | 12/2002 | Bello et al. | |
| 6,510,422 B1 | 1/2003 | Galindo-Legaria et al. | |
| 6,513,029 B1 | 1/2003 | Agrawal et al. | |
| 6,567,802 B1 | 5/2003 | Popa et al. | |
| 6,571,233 B2 | 5/2003 | Beavin et al. | |

(Continued)

OTHER PUBLICATIONS

Swami, Arun, Optimization of Large Join Queries, ACM 1988, pp. 8-17.

(Continued)

*Primary Examiner* — Apu M Mofiz
*Assistant Examiner* — Hung D Le
(74) *Attorney, Agent, or Firm* — Stephen J. Walder, Jr; Elisse Y. Wang

(57) ABSTRACT

Processing a multiple table query includes: determining if any tables in the query require materialization; for each table in the query that requires materialization, deriving at least one join predicate on a join column; determining if any tables earlier in a join sequence for the query has same join predicates; and applying the at least one derived join predicate to an earlier table in the join sequence, if there is at least one table earlier in the join sequence that has the same join predicate. This significantly reduces the number of rows that are joined before arriving at the final result.

5 Claims, 2 Drawing Sheets

U.S. PATENT DOCUMENTS

| | | | |
|---|---|---|---|
| 6,629,094 | B1 | 9/2003 | Colby et al. |
| 6,732,096 | B1 * | 5/2004 | Au .................................. 1/1 |
| 7,136,850 | B2 | 11/2006 | Keller et al. |
| 7,191,169 | B1 | 3/2007 | Tao |
| 7,240,078 | B2 | 7/2007 | Cheng et al. |
| 7,315,852 | B2 | 1/2008 | Balmin et al. |
| 7,536,379 | B2 * | 5/2009 | Purcell .............................. 1/1 |
| 2002/0078015 | A1 | 6/2002 | Ponnekanti |
| 2002/0188600 | A1 | 12/2002 | Lindsay et al. |
| 2003/0055814 | A1 | 3/2003 | Chen et al. |
| 2003/0093415 | A1 | 5/2003 | Larson et al. |
| 2003/0101335 | A1 | 5/2003 | Gillies et al. |
| 2003/0167258 | A1 | 9/2003 | Koo et al. |
| 2003/0187864 | A1 | 10/2003 | McGoveran |
| 2003/0195881 | A1 | 10/2003 | Koo et al. |
| 2003/0212701 | A1 | 11/2003 | Beavin et al. |
| 2004/0122804 | A1 | 6/2004 | Zhang et al. |
| 2004/0128287 | A1 | 7/2004 | Keller et al. |
| 2004/0220911 | A1 | 11/2004 | Zuzarte et al. |
| 2004/0220923 | A1 | 11/2004 | Nica |
| 2005/0071331 | A1 | 3/2005 | Gao et al. |
| 2005/0091208 | A1 | 4/2005 | Larson et al. |
| 2005/0114307 | A1 | 5/2005 | Li et al. |
| 2005/0187917 | A1 | 8/2005 | Lawande et al. |
| 2005/0198013 | A1 | 9/2005 | Cunningham et al. |

OTHER PUBLICATIONS

Swami, Arun, "Optimization of Large Join Queries: Combining Heuristics and Combinatorial Techniques," ACM0-89791-3175/89/0005/0367, 1989, pp. 367-376.

Lahiri, T., "Genetic Optimization Techniques for Large Join Queries," Proceedings of 3 Sup.Rd Annual Conference on Genetic Programming, 1998, pp. 535-542 (abstract).

Ono, K., et al., "Measuring the Complexity of Join Enumberation in Query Optimization," 16.Sup.th Intl. Conference on Very Large Data Bases, 1990, pp. 314-325 (abstract).

Mumick, I.S., et al., "The Magic of Duplicates and Aggregates," in Proccedings, 16th International Conference on Very Large Data Bases, Brisbane, Aug. 1990.

Seshadri, P., et al. "Complex Query Decorrelation," Proceedings of the International Conference on Data Engineering (ICDE), Louisiana, USA Feb. 1996.

Chiang, Lee, et al., Optimizing Large Join Queries Using a Graph-Based Approach, IEEE, Mar.-Apr. 2001, 298-315.

Silberberg, David, "Role-Based Semantics for Conceptual-Level Queries," Proceedings of the 5th KRDB Workshop, Seattle, WA, May 31, 1998, 17-1-17-10.

Rosenthal, A., et al., "An Architecture for Query Optimization," Proceedings. of ACJ-SIGMOD, 1982.

Lohman, G.M., et al., "Optimization of Nested Queries in a Distributed Relational Database," Proceedings of 10th VLDB, Aug. 1984, pp. 403-415.

Ioannidis, Y.E., et al., Randomized Algorithms for Optimizing Large Join Queries, SIDMOD Conference, 1990, pp. 312-321.

Swami, A., et al., A Polynomial Time Algorithm for Optimizing Join Queries, ICDE, 1993, pp. 345-354.

Cheng, J., et al., "An Efficient Hybrid Join Algorithm: A DB2 Protype, Data Engineering," 1991, Proceedings 7th International Conference, 1991, pp. 171-180.

Krishnamurthy, et al., "Optimization of Nonrecursive Queries," Twelfth International Conference on Very Large Databases, Aug. 1996, pp. 128-137.

Ibaraki, et al., "On the Optimal Nesting Order for Computing N-Relational Joins," ACM Transactions on Databases Systems, vol. 9, No. 3, Sep. 1984, pp. 482-502.

Lee, et al., "Implicit Joins in the Structural Data Model," IEEE, 1991, pp. 357-364.

Dong H., et al., "Generic Algorithms for Large Join Query Optimization," pp. 1-8.

Lahiri, Tirthankar, "Genetic Optimization Techniques for Large Join Queries", Proceedings of 3.sup.rd Annual Conference on Genetic Programming, 1998, pp. 535-542 (abstract).

* cited by examiner

```
SELECT *
FROM T1 JOIN T2
ON T1.C1=T2.C1
JOIN
(SELECT C2, COUNT(*)
  FROM T3
  WHERE C3=?
  GROUP BY C2) AS T3
ON T2.C2=T3.C2
WHERE T1.C3=?
```

GENERATED PREDICATES FROM MATERIALIZED RESULT

CROSS REFERENCE TO RELATED APPLICATIONS

This application claims the benefit of priority under 35 USC 120 as a continuation application to U.S. application Ser. No. 11/014,155, entitled "GENERATED PREDICATES FROM MATERIALIZED RESULT" filed on Dec. 15, 2004, the contents of which are hereby incorporated in its entirety.

FIELD OF THE INVENTION

The present invention relates to multiple table queries, and more particularly to the filtering of the result of multiple table queries.

BACKGROUND OF THE INVENTION

Queries involving the joining of multiple tables in a database system are known in the art. For example, if a query includes a WHERE clause predicate and filtering occurs at more than one table, more rows than necessary may be joined between two or more tables before the filter is applied. The WHERE clause specifies an intermediate result table that includes those rows of a table for which the search condition is true. This is inefficient.

For example, assume a 10 table join. If each table has predicates that perform some level of filtering, then the first table may return 100,000 rows (after filtering is applied to this table), the second table filters out 20%, the third a further 20%, etc. If each table (after the first) provide 20% filtering, then the final result is approximately 13,000 rows for a 10 table join. Therefore, approximately 87,000 unnecessary rows are joined between tables 2 and 3, 67,000 between tables 3 and 4, etc.

Accordingly, there exists a need for an improved method for processing multiple table queries. The improved method should derive predicates based on a join relationship between tables and apply these derived predicates to tables earlier in the join sequence. The present invention addresses such a need.

SUMMARY OF THE INVENTION

A computer readable medium for processing a multiple table query includes: determining if any tables in the query require materialization; for each table in the query that requires materialization, deriving at least one join predicate on a join column; determining if any tables earlier in a join sequence for the query has same join predicates; and applying the at least one derived join predicate to an earlier table in the join sequence, if there is at least one table earlier in the join sequence that has the same join predicate. This significantly reduces the number of rows that are joined before arriving at the final result.

DETAILED DESCRIPTION

The present invention provides an improved method for processing multiple table queries. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 3 in conjunction with the discussion below.

Figure 1:
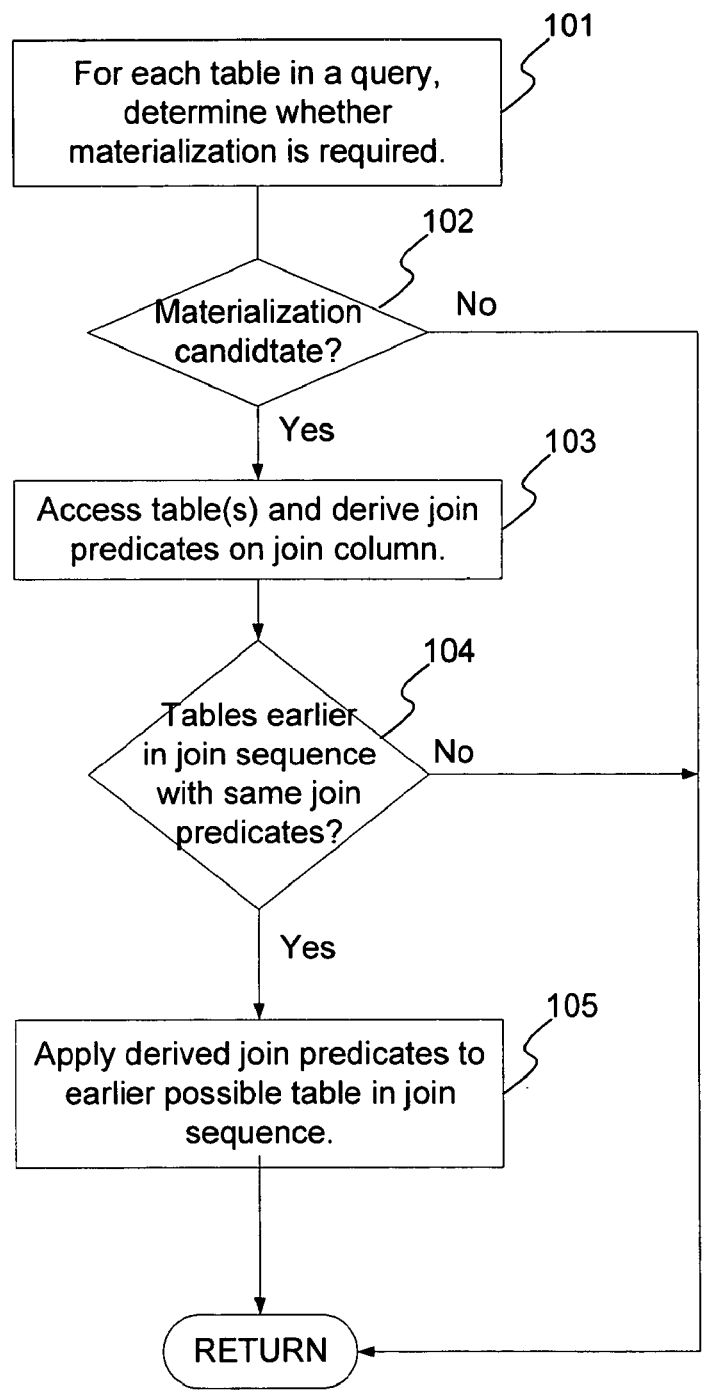
FIG. 1 is a flowchart illustrating an embodiment of a method for processing a multiple table query in accordance with the present invention.

FIG. 1 is a flowchart illustrating an embodiment of a method for processing a multiple table query in accordance with the present invention. First, for each table, it is determined whether materialization is required, via step 101. For any tables that are materialization candidates, via step 102, the tables are accessed, and join predicates are derived on the join columns, via step 103. Next, if there are tables earlier in the join sequence with the same join predicates, via step 104, then the derived predicates are applied to an earlier table in the join sequence, via step 105.

In this embodiment, the derived predicate is either of the type IN or BETWEEN, depending on the number of values in the result and the expected filtering. The IN predicate compares a value with a collection of values. The BETWEEN predicate compares a value with a range of values. The predicates are derived on the join predicates based upon the result after filtering to be applied to tables earlier in the join sequence. These predicates are derived on the join columns as they can only be applied to other tables where the predicates can be transitively closed through the join predicates. These predicates are then available as index matching, screening, or page range screening.

Derived predicates should be available as regular indexable (matching or screening) predicates similar to any other transitively closed predicate. This can provide a significant performance improvement if these filtering predicates can limit the data access on an earlier table in the I/Os, in addition to the reduction in rows that are joined from application of filtering earlier in the join process.

In this embodiment, an IN and/or a BETWEEN predicate are derived during runtime. Since the estimated size of the materialized result cannot be relied upon before the bind or prepare process because the actual number of rows in the materialized result cannot be guaranteed until runtime, the choice to generate a BETWEEN or IN predicates is a runtime decision. If the number of elements in the materialized result is small then generally an IN list that includes all element would be more suitable. If the number of element is large, then the low and high values should be selected from the materialized result to build the BETWEEN predicate.

For example, if the materialized result contained 2 values, 3 and 999, then it would be more beneficial to generate COL IN (3, 999) rather than BETWEEN 3 AND 999. If the materialized result contains a larger number of values, such as 100, then the BETWEEN will generally become more efficient.

If the materialized result is a single value, then COL IN (3) OR COL BETWEEN 3 AND 3 are equivalent. A result of zero rows would trigger a termination of the query if it was guaranteed that the final result would be zero. This would be the case if access to the materialized result was joined by an inner join, where the column that is not common to all the tables being joined is dropped from the resultant table.

Optionally, a materialized result set can utilize one of the existing indexing technologies, such as sparse index on workfiles or in-memory index, to create an indexable result set where an index did not previously exist on the base table to support the join predicates. This makes it attractive to materialize tables where materialization was not previously mandatory, but by doing so provides a smaller result set to join to with a sparse index or as an in-memory index.

Although it is desirable to apply the derived predicates to the earliest possible table in the join sequence, other factors may limit this: if many tables provide strong filtering, then only one can be first in the table join sequence; sort avoidance may be the preference if a sort can be avoided by a certain join sequence; join predicates or indexing may dictate a join sequence that makes best use of join predicates but not filtering; and outer joins dictate the table join sequence.

Figures 2, 3:
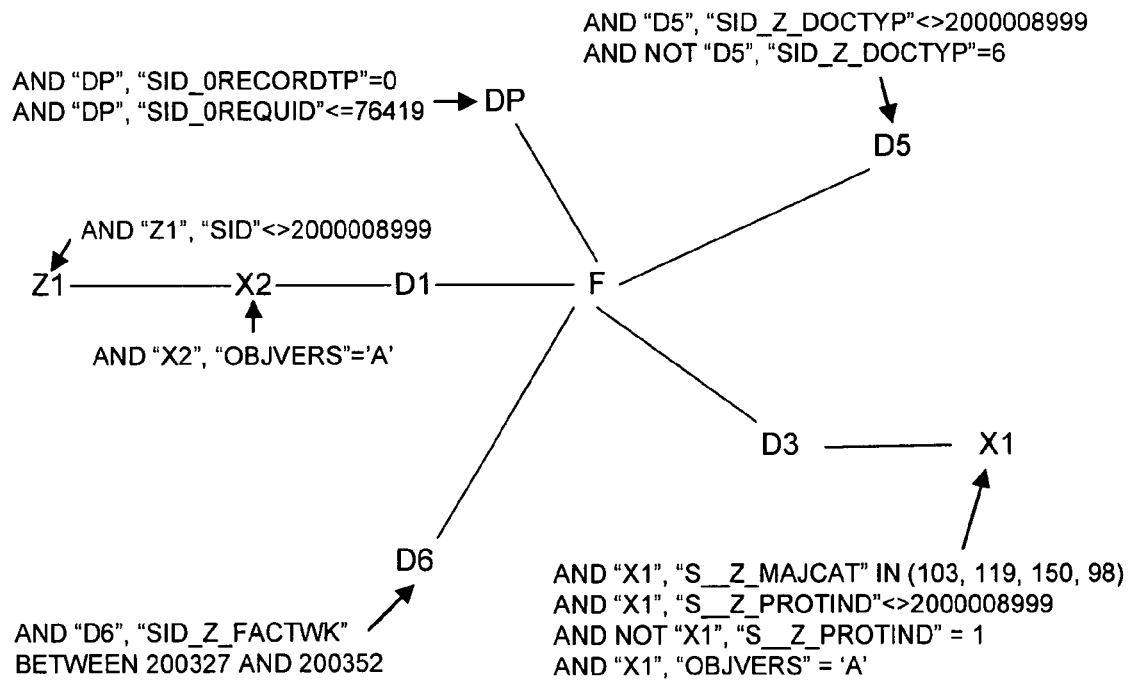
FIG. 2 illustrates a first example of the method for processing a multiple table query in accordance with the present invention.
FIG. 3 illustrates a second example of the method for processing a multiple table query in accordance with the present invention.

FIG. 2 illustrates a first example of the method for processing a multiple table query in accordance with the present invention. In this example, there are three tables to be joined, T1, T2, and T3. With a join sequence of T1-T2-T3, filtering is applied to T1 and T3. T3 is determined to require materialization due to the GROUP BY clause, via steps 101-102. A GROUP BY clause specifies an intermediate result table that contains a grouping of rows of the result of the previous clause of the subselect. Here, T3 is accessed first, via step 103, with the result stored in a workfile in preparation for the join of T1 and T2. Thus, the join becomes T1-T2-WF (workfile from T3 materialization).

Assume that T1.C1=? qualifies 5,000 rows, and the result of T3 (after C1=? and GROUP BY) is 1,000 rows ranging from 555-3,200 (with maximum range of 1-9,999). Thus the join of T1 to T2 would be 5,000 rows. The T1/T2 composite of 5,000 rows would then be joined with T3, with only 500 rows intersecting with T3 result of 1000 rows.

Using the method in accordance with the present invention, in the process of materializing and sorting the result of T3, the high and low key of C2 is determined to be 555 to 3220. At runtime, the predicate T2.C2 BETWEEN 555 AND 3220 can be derived, via step 103, after the materialization of T3, and then applied to T2, via steps 104-105. The 5,000 T1 rows will be joined to T2, but a subset of T2 rows will qualify after the application of the BETWEEN predicate. Assuming T2 and T3 form a parent/child relationship, 500 rows will quality on T2 after the derived predicate is applied. If this predicate is an index matching predicate, then 4500 less index and data rows will be accessed from T2. Regardless of when the predicate is applied to T2, 4500 less row swill be joined to T3.

FIG. 3 illustrates a second example of the method for processing a multiple table query in accordance with the present invention. This example includes star join queries, which can have filtering come from many dimension and/or snowflake tables. Star join queries are known in the art. Here, the filtering comes from dimension tables DP, D5 and D6, and also snowflake tables D1/X2/Z1 and D3/X1. Not all filtering can be applied before the fact table, F, because of index availability and also to minimize the Cartesian product size.

Assume, based upon index availability, the table join sequence is D5-D6-F-SF1 (D1/X2/Z1)-SF2 (D3/X1)-DP, where SF1 and SF2 are materialized snowflakes. While materializing and sorting these snowflakes, the key ranges on the join predicates can be generated or derived, via steps 101-103 and applied against the fact table, via steps 104-105. The derived predicates are on the join predicates between the materialized results and the earliest related table accessed in the join sequence.

With join predicates of F.KEY_D1=D1.KEY_D1 and F.KEY_D3=D3.KEY_D3, and the runtime outcome of materializing the snowflake tables, the following predicates can be derived to be applied against the fact table: AND F.KEY_D1 BETWEEN 87 AND 531; and AND F.KEY_D3 IN (103, 179, 216, 246, 262, 499). The result is a reduction in the rows that qualify from the fact table, and therefore fewer rows are joined after the fact table. This can provide a significant enhancement since data warehouse queries may access many millions of rows against a fact table, and therefore any filtering can reduce this number.

An improved method for processing a multiple table query has been disclosed. The method accesses and evaluates the filtering of any tables in a query that require or can benefit from materialization. Predicates based on the join predicates after filtering are then derived. While materializing and sorting, the derived predicates are applied to tables earlier in the join sequence. This significantly reduces the number of rows that are joined before arriving at the final result.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer readable medium encoded with a computer program for processing a multiple table query, the computer program comprising computer executable instructions for:
    determining if any tables in the multiple table query require materialization; for each table in the multiple table query that requires materialization, deriving a join predicate on a join column of the table;
    for each table having a derived join predicate, determining if any other tables earlier in a join sequence for the multiple table query has a same join predicate;
    responsive to a table earlier in the join sequence having the same join predicate, applying the derived join predicate to the earlier table in the join sequence to reduce an amount of rows that need to be joined between the tables in the multiple table query during processing of the join sequence; and
    storing a result of applying the derived join predicate.

2. The computer readable medium of claim 1, wherein each derived predicate is available as an indexable predicate.

3. The computer readable medium of claim 2, wherein each derived predicate comprises a predicate that compares a value with a collection of values.

4. The computer readable medium of claim 2, wherein each derived predicate comprises a predicate that compares a value with a range of values.

5. The computer readable medium of claim 1, wherein factors for determining whether a table earlier in the join sequence for the multiple table query has a same join predicate comprises one or more of the group consisting of: a number of tables in the join sequence with strong filtering, join predicates or indexing dictates a join sequence that makes best use of join predicates but no filtering, and an out join in the join sequence.

* * * * *